(12) United States Patent
Willis et al.

(10) Patent No.: US 6,834,092 B2
(45) Date of Patent: Dec. 21, 2004

(54) METHOD OF REPAIRING LEAKING ELONGATE HOLLOW MEMBERS IN BOILING WATER REACTORS

(75) Inventors: Eric R. Willis, San Jose, CA (US); Sampath Ranganath, San Jose, CA (US); Paul Van Diemen, Morgan Hill, CA (US)

(73) Assignee: General Electric Company, Schenectady, NY (US)

( * ) Notice: Subject to any disclaimer, the term of this patent is extended or adjusted under 35 U.S.C. 154(b) by 144 days.

(21) Appl. No.: 10/193,992

(22) Filed: Jul. 15, 2002

(65) Prior Publication Data

US 2004/0008807 A1 Jan. 15, 2004

(51) Int. Cl.$^7$ .............................................. G21C 13/028
(52) U.S. Cl. ....................... 376/260; 376/203; 376/292; 29/402.07
(58) Field of Search .................................. 376/260, 203, 376/292, 307, 446, 261; 29/402.07, 402.08, 890.031

(56) References Cited

U.S. PATENT DOCUMENTS

| | | | | |
|---|---|---|---|---|
| 3,723,742 A | * | 3/1973 | Aranguren et al. | 250/493.1 |
| 4,432,824 A | * | 2/1984 | Cook et al. | 156/165 |
| 4,444,555 A | * | 4/1984 | Edwardsen et al. | 432/30 |
| 4,480,841 A | | 11/1984 | Schukei et al. | 277/1 |
| 4,510,171 A | * | 4/1985 | Siebert | 427/34 |
| 4,611,813 A | * | 9/1986 | Guerrero | 277/314 |
| 4,647,749 A | * | 3/1987 | Koshy | 219/76.14 |
| 4,826,217 A | * | 5/1989 | Guerrero | 285/141.1 |
| 5,006,300 A | * | 4/1991 | Jonsson et al. | 376/203 |
| 5,209,894 A | * | 5/1993 | Borrman et al. | 376/203 |
| 5,274,683 A | * | 12/1993 | Broda et al. | 376/260 |
| 5,796,797 A | | 8/1998 | Fallas | 376/260 |
| 5,809,098 A | | 9/1998 | Deaver | 376/203 |
| 6,082,444 A | * | 7/2000 | Harada et al. | 165/133 |

OTHER PUBLICATIONS

Ronald Martin Horn et al., "Method and Apparatus for Automated Crack Behavior Prediction Determination", U.S. Patent Appl. Pub. No. US 2001/0053965 A1, Dec. 20, 2001.

* cited by examiner

Primary Examiner—Michael J. Carone
Assistant Examiner—Dan Matz
(74) Attorney, Agent, or Firm—Harness, Dickey & Pierce, P.L.C.

(57) ABSTRACT

The method facilitates sealing a control rod drive (CRD) housing to a stub tube in a reactor pressure vessel of a nuclear reactor, if any cracks develop proximate a heat affected zone of the stub tube at a CRD housing re-attachment weld. The method includes cutting the CRD housing to separate an upper portion of the CRD housing from a lower portion of the CRD housing. The lower portion remains in place and in substantial alignment with the upper portion of the CRD housing. A lower portion member, which may be the lower portion that was cut, is re-attached to the reactor vessel by a re-attachment weld at a location below potential differential leakage paths along the CRD housing. The heat affected zone (e.g., at the re-attachment weld) is covered with a corrosion resistant material to prevent future leaking, and to protect the weld from inter-granular stress corrosion cracking (IGSCC).

25 Claims, 2 Drawing Sheets

METHOD OF REPAIRING LEAKING ELONGATE HOLLOW MEMBERS IN BOILING WATER REACTORS

BACKGROUND OF THE INVENTION

1. Field of the Invention

This invention relates generally to boiling water nuclear reactors and more particularly, to repairing or sealing leaking elongate hollow members such as control rod drive housings and stub tubes in a nuclear reactor pressure vessel of such reactors.

2. Related Art

Boiling water nuclear reactors typically include a reactor core located within a reactor pressure vessel (RPV). A known RPV includes a substantially cylindrical shell. The shell, for example, can be about twenty feet in diameter and about seven inches thick.

The cylindrical shell is closed at its top end by a removable top head. The top head is removable so that components, such a fuel bundles, located in the RPV can be accessed. The RPV cylindrical shell is closed at its bottom end by a dome shaped bottom head assembly welded to the shell.

A plurality of openings are formed in the bottom head dome so that components, such as control rod drive assemblies, can extend within the RPV. Typically, a substantially cylindrical stub tube having a bore extending therethrough is welded to the bottom head dome and the tube bore aligns with an opening in the bottom head dome. The cylindrical stub tube typically is fabricated from a corrosion resistant material such as stainless steel or Ni—Cr—Fe.

As an example, for a control rod drive assembly, the control rod drive housing, e.g., a tube, is inserted through the bottom head dome opening and stub tube bore, and the housing extends into the RPV. The control rod drive (CRD) housing is welded to the stub tube to maintain the housing in the desired position. The stub tube thus serves as a transition piece between the bottom head dome, which typically is fabricated from low alloy steel, and the CRD housing, which typically is fabricated from stainless steel such as 304 stainless steel with a high carbon content.

Inter-granular stress corrosion cracking (IGSCC) is a known phenomenon occurring adjacent to stub tube welds connecting the bottom head dome to the stub tube and connecting the stub tube to the CRD housing. Particularly, the stub tube welds are subject to a variety of stresses associated with, for example, differences in thermal expansion, the operating pressure needed for the containment of the reactor cooling water, and other sources such as residual stresses from welding, cold working and other inhomogeneous metal treatments. Such stresses may, at times, cause cracks adjacent the stub tube welds.

If stress corrosion cracks adjacent stub tube welds are not sealed, such cracks cause potential leakage paths between the stub tube and the bottom head dome, and the stub tube and the CRD housing, respectively, which is undesirable. Accordingly, upon detection of any such cracks, it is desirable to re-seal the control rod drive housing, for example, to the bottom head dome.

Type 304 stainless steel stub tubes in some plants have become furnace sensitized as a result of vessel post weld heat treatment. This has left the stub tube in an inter-granular stress corrosion cracking (IGSCC) susceptible state, and has led to leaking cracks. Cracking has been observed in the heat affected zone of the stub tube at the CRD housing attachment weld of this susceptible material. This results in a reactor coolant leakage path to the undervessel area. Restoration of the defective area is virtually impossible due to the location of the stub tubes and the existing material condition.

One known method of repairing or re-sealing CRD housings within the bottom head dome includes completely replacing the stub tube and CRD housing. This method, however, is time consuming, tedious, and expensive. Particularly, the housing and associated stub tube are partially cut-off and the material remaining in the bottom head assembly is inspected to ensure that such material can be welded without damaging the bottom head. A weld build-up is then formed over the remaining material and machined so that a new stub tube can be welded to the weld build-up. Several weeks can be required to perform the replacement process of just one penetration tube. Moreover, much of the replacement work must be performed within the RPV, which requires completely unloading the RPV and is undesirable.

Another known method of repairing or re-sealing a CRD housing within the bottom head dome includes welding a sleeve to the CRD housing and the stub. This method, however, only addresses stress corrosion cracks adjacent the interface between the stub tube and the CRD housing. Moreover, installing the sleeve must be performed entirely within the RPV which, as explained above, is undesirable.

Yet another known method of repairing or re-sealing a CRD housing within the bottom head dome includes rolling the CRD housing into the bottom head dome. While this method is quicker than replacing the stub tube and CRD housing, rolling the CRD housing into the bottom head dome does not create as tight a seal as a weld between the CRD housing and the dome. Moreover, the rolled CRD housing may become separated from the bottom head dome after continued RPV operation, and must then be re-rolled. Re-rolling a CRD housing, however, often is neither desirable nor practical.

Still another known method of repairing or re-sealing a CRD housing within the bottom head dome includes removing and replacing a lower portion of the CRD housing within the bottom head dome. Particularly, a lower portion of the CRD housing is cut-off so that an upper portion of the CRD housing remains inserted in an opening in the bottom head dome and welded to the stub tube. The bottom head dome is then cleaned, and the lower end of the remaining CRD housing upper portion is machined so that a replacement bottom portion of CRD housing can be welded to the remaining upper portion. The replacement bottom portion of CRD housing similarly is machined so that it can be welded to the remaining upper portion. The replacement bottom portion of CRD housing is then inserted into the bottom head dome opening and positioned adjacent the remaining upper portion. The replacement bottom portion and the remaining upper portion of CRD housing are then temper bead welded to each other and to the bottom head dome. Temper bead welding the remaining upper portion to the replacement lower portion and the bottom head dome has the undesirable effect of causing high stresses because of thermal growth mismatch between the CRD housing and the bottom head dome, which are fabricated from different materials. Such temper bead welding also has the undesirable potential effect of trapping water within a leakage path and in contact with the weld between the remaining upper portion and the bottom head dome.

It would be desirable, therefore, to provide a method for repairing and/or sealing a CRD housing within the bottom head dome which can be more easily and quickly performed than known sealing methods. It further would be desirable to provide such a method which reduces stresses caused by thermal growth mismatches between the CRD housing and the bottom head dome.

SUMMARY OF THE INVENTION

The method in accordance with the invention, in one embodiment, facilitates repairing and/or re-sealing a substantially elongate hollow member such as a control rod drive (CRD) housing within a reactor pressure vessel of a nuclear reactor more quickly and easily than known methods. The method eliminates leaks due to cracking in a heat affected zone of a stub tube at a CRD housing re-attachment weld and restores the pressure boundary. The reactor pressure vessel includes a bottom head dome having at least one opening extending therethrough, a substantially hollow stub tube, and a control rod drive housing. A lower portion of the stub tube is welded to the bottom head dome with a lower stub tube weld so that a bore extending through the stub tube is substantially aligned with the bottom head dome opening. The upper portion of the stub tube is welded to the CRD housing with an upper stub tube weld so that the CRD housing extends through and is secured within the bottom head dome opening and the stub tube bore.

The method includes cutting the CRD housing at a location below the upper stub tube weld to separate an upper portion of the CRD housing from a lower portion of the CRD housing. For example, the existing lower portion of the CRD housing is severed below a stub tube attachment weld. The existing lower portion is not removed; however, but remains in place and in substantial alignment with the upper portion of the CRD housing. After machining, cleaning and buffering of the cut lower portion, a lower portion member, which may be the lower portion that was cut, is re-attached to the reactor vessel at a point below potential differential leakage paths along the CRD housing. The existing lower portion is then secured to the bottom head dome without also being secured to the CRD upper portion. Specifically, the existing lower portion is temper bead welded to a sidewall of the bottom head dome opening. The heat affected zone (e.g., at the temper beaded re-attachment weld) is covered with a corrosion resistant material to prevent future leaking, and to protect the weld heat-affected zone from IGSCC.

DETAILED DESCRIPTION

Figure 1:
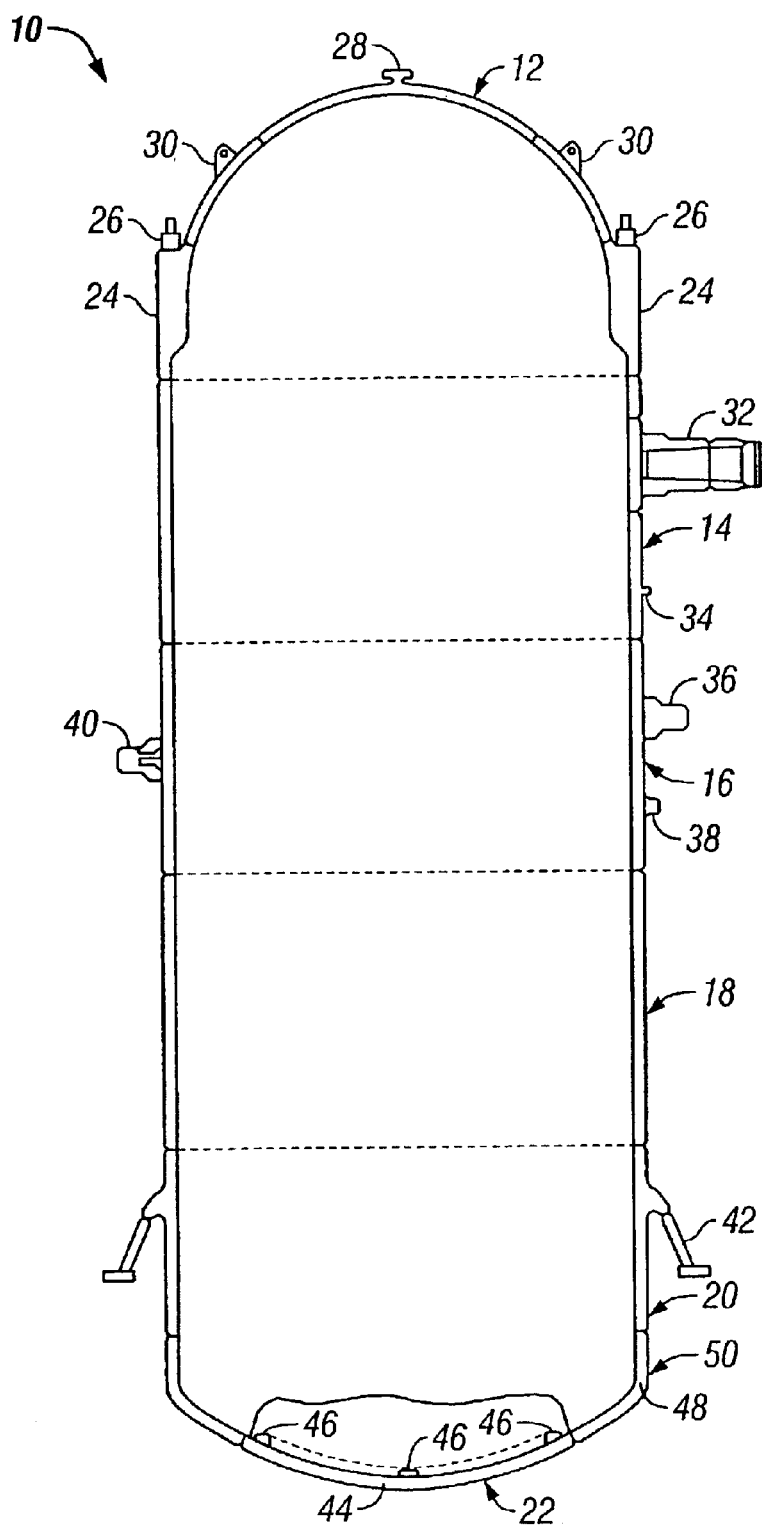
FIG. 1 is a schematic illustration of a reactor pressure vessel.

FIG. 1 is a schematic illustration of a reactor pressure vessel (RPV) 10. RPV 10 includes a top head 12, four substantially cylindrical shell courses 14, 16, 18 and 20, and a bottom head assembly 22. Top head 12 includes a head flange 24. First shell course 14 includes a vessel flange (not shown). Top head 12 is bolted to first shell course 14 by bolts 26 which extend through head flange 24. Top head 12 also includes a head spray and vent nozzle 28 and lifting flanges 30 used when lifting top head 12 from first shell course 14.

First shell course 14 includes main steam nozzles 32 through which steam flows out of the RPV 10. Stabilizer brackets 34 also are formed on first shell course 14. Second shell course 16 has a number of nozzles 36, 38 and 40 formed therein. Fourth shell course 20 includes a support skirt 42 welded thereto. Support skirt 42 is utilized to support RPV 10 within the reactor housing (not shown).

Bottom head assembly 22 includes a bottom head dome 44 having a plurality of stub tubes 46 welded thereto. Stub tubes 46 are substantially cylindrical and each stub tube 46 has a bore (not shown in FIG. 1) extending therethrough. The bore of each stub tube 46 is aligned with an opening (not shown in FIG. 1) in bottom head dome 44. Components such as control rod drives, in-core instruments, pressure instrument nozzles, and drain nozzles extend through such bottom head dome openings and stub tube bores and penetrate into RPV 10.

FIG. 1 is provided primarily for illustrative purposes to show a typical bottom head assembly 22. The present invention, as described below, can be used in many RPV configurations other than RPV 10.

Figure 2:
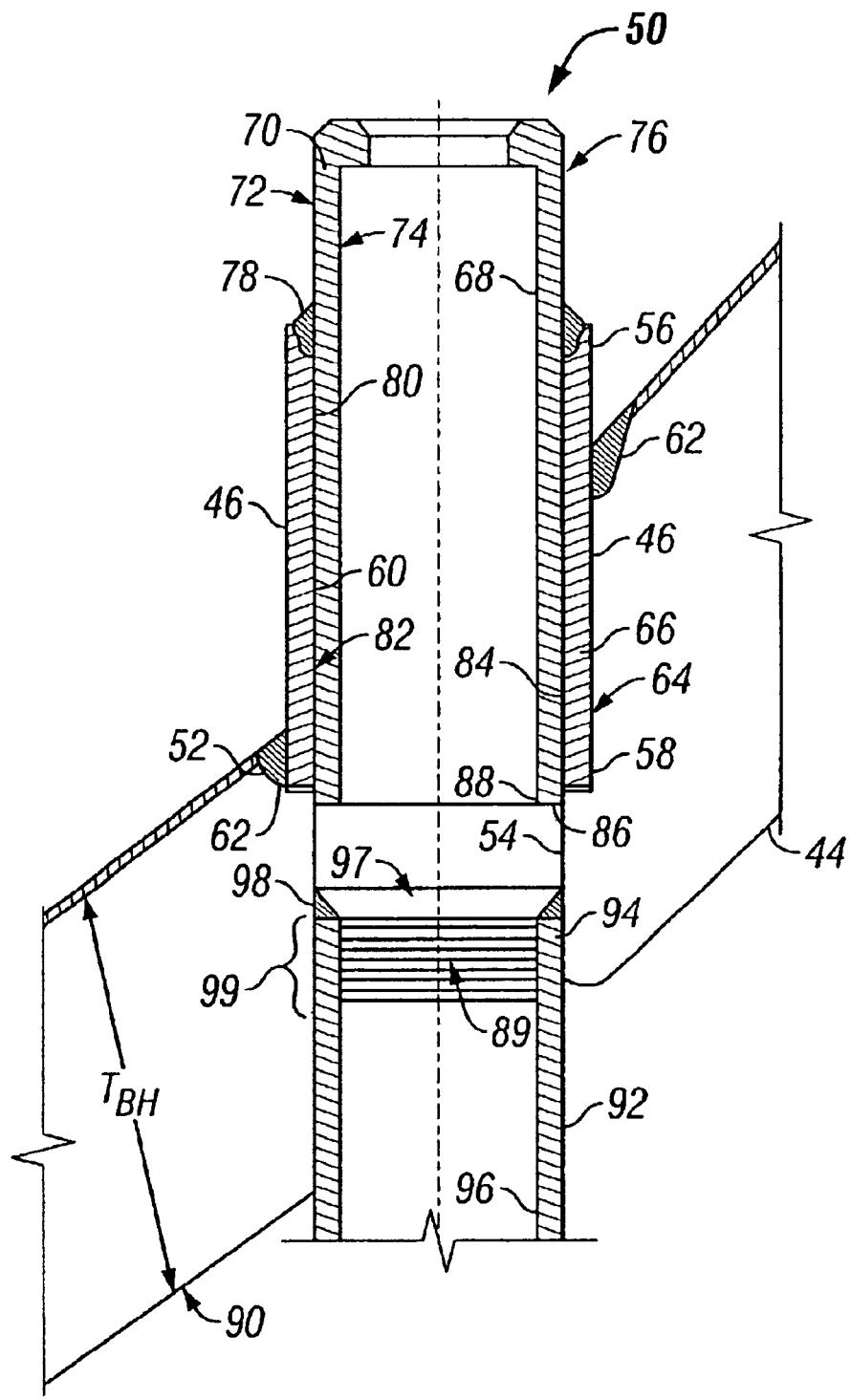
FIG. 2 is a partial cross-section view of a control rod drive housing, a stub tube, and a bottom head of a pressure reactor vessel wherein the control rod drive housing is sealed to the stub tube in accordance with one embodiment of the present invention.

FIG. 2 is a partial cross-section view of a control rod drive housing 50, one stub tube 46, and bottom head dome 44 of RPV 10 wherein control rod drive housing 50 is sealed to stub tube 46 in accordance with one embodiment of the present invention. As shown more clearly, bottom head dome 44 has a thickness $T_{BH}$, and includes a substantially cylindrical opening 52 therein defined by a sidewall 54. Stub tube 46 includes a first end 56 and a second end 58, and a stub tube bore 60 extends between first and second ends 56 and 58. Stub tube 46 is positioned concentric bottom head dome opening 52 so that stub tube bore 60 is substantially aligned with bottom head dome opening 52. Stub tube 46 is secured to bottom head dome 44 with a lower stub attachment weld 62. Particularly, an outer surface 64 of stub tube sidewall 66 proximate second end 58 is welded to bottom head dome 44 with lower stub tube attachment weld 62.

Control rod drive housing 50 includes a first end (not shown) a second end (not shown) and a bore 68 extending between the first and second ends. Particularly, control rod drive housing 50 has a substantially hollow cylindrical geometric shape including a sidewall 70 having an outer surface 72 and an inner surface 74 which defines bore 68. Control rod drive housing 50 is positioned so that it extends through bottom head dome opening 52 and stub tube bore 60. An upper portion 76 of control rod drive housing 50 is secured to stub tube 46 with an upper stub tube attachment weld 78 adjacent stub tube first end 56 so that control rod drive housing 50 is substantially concentrically and fixedly secured within stub tube 46. As explained above, the positioning and welding of control rod drive housing 50 within stub tube 46 and bottom head dome 44 is well known. Furthermore, bottom head 44 is fabricated from low alloy steel, and stub tube 46 and control rod housing 50 are fabricated from a compatible corrosion resistant materials such as stainless steel or Ni—Cr—Fe.

Stress corrosion cracks sometimes occur adjacent upper stub tube attachment weld 78 or lower stub tube attachment weld 62. If such a crack occurs adjacent upper weld 78, an annulus leakage path 80 is formed between an inner surface 82 of stub tube sidewall 66 and outer surface 72 of control rod drive housing 50. Similarly, if such a crack occurs adjacent lower weld 62, an annulus leakage path 84 is formed between outer surface 72 of control rod drive housing 50 and sidewall 54 of bottom head dome opening 52.

To seal these leakage paths, the CRD housing must be repaired. The repair work can be performed from the undervessel with a water tight (temporary) seal placed over the stub tube from inside the vessel. The reactor vessel remains flooded to provide radiation shielding and reduce overall outage time. To seal annulus leakage paths 80 and 84 in accordance with one embodiment of the present invention, CRD housing 50 is cut at a location 86 below upper stub tube attachment weld 78. Particularly, control rod drive housing 50 is cut at location 86 below stub tube second end 58 to separate upper portion 76 of control rod drive housing 50 from a lower portion 92 of control rod drive housing 50. The lower portion 92 is not removed, but remains in place.

After cutting the lower portion 92, bottom head dome opening 52 is cleaned. For example, a grinder (not shown) may be extended into bottom head dome opening 52 and utilized to grind sidewall 54 of bottom head dome opening 52 between a lower end 88 of upper portion 76 and a bottom end 90 of bottom head dome 44 to form a weld passage (e.g., area over which a weld may be applied) between lower end 88 and bottom end 90. Alternatively, bottom head dome opening 52 may be cleaned with a flapper wheel or by honing. Methods for cleaning bottom head dome opening 52 are known.

The existing lower portion 92 is then re-attached so that it is substantially aligned with and adjacent to upper portion 76. Existing lower portion 92 is a substantially hollow member having a substantially cylindrical geometric shape. More particularly, existing lower portion 92 includes an upper end 94, a lower end (not shown), and a bore 96 extending between upper end 94 and the lower end.

Upper end 94 of existing lower portion 92 includes a weld prep 98 for welding upper end 94 to sidewall 54 of bottom head dome opening 52. Particularly, upper end 94 of existing lower portion 92 is cleaned in accordance with known methods so that upper end 94 has a substantially frusto-conical geometric shape. This provides a clean oxide-free surface to form weld prep 98. For example, a grinder may be used to grind upper end 94. Alternatively, upper end 94 may be cleaned with a flapper wheel or by honing.

Existing lower portion 92 is re-attached in bottom head dome opening 52 so that upper end 94 is proximate lower end 88 of remaining upper portion 76 and so that control rod housing bore 68 remains substantially aligned with bore 96. As shown in FIG. 2, upper end 94 of existing lower portion 92 is spaced from lower end 88 of remaining upper portion 76.

The lower portion 92 within bottom head dome opening 52 is re-attached to sidewall 54 of bottom head dome opening 52 without also being secured to lower end 88 of remaining portion 76. The existing lower portion 92 is preferably re-attached at a point different then the location where it was initially cut, e.g., lower than where lower portion 92 was cut initially at location 86 below stub tube second end 58 to separate upper portion 76 of control rod drive housing 50 from lower portion 92. Particularly, upper end 94 of lower portion 92 is bead welded to provide a weld 97, using known welding methods such as temper bead welding techniques, to sidewall 54 of bottom head dome opening 52.

The weld 97 is provided at a location that is preferably at a point below potential differential leakage paths in the CRD 50. For example, this location may be at a point that is lower than annulus leakage path 80 between inner surface 82 of stub tube sidewall 66 and outer surface 72 of CRD 50; and/or below annulus leakage path 84 formed between outer surface 72 of control rod drive housing 50 and sidewall 54 of bottom head dome opening 52, as shown in FIG. 2.

To form the weld, an automatic welding machine may be inserted through bore 96 so that a welding head is substantially adjacent to weld prep 98. The automatic welding machine then may be used to apply a temper bead weld 97 to sidewall 54 of bottom head dome opening 52, as is known. A UT machine, for example, may then be inserted through bore 96 to ascertain the quality of the bead weld.

The welding of lower portion 92 to re-attach it to the bottom head dome 44 at bottom head dome opening 52 introduces a new heat affected zone 99 in the high carbon stainless steel at weld 97, which ordinarily is susceptible to IGSCC. As shown in FIG. 2, the heat affected zone 99 is covered with a corrosion resistant material 89, which preferably is a cladding 89 that is applied over the heat affected zone 99 of weld 97. The application of corrosion resistant cladding 89 thereby reduces the probability of introducing a new potential failure mechanism.

To apply the cladding, the CRD housing 50 is sealed at the top, near upper section 76 to provide a dry environment inside. The outside of the CRD housing 50 remains wet. In general, an apparatus or tool such as a weld head is inserted from a bottom end (not shown) of the CRD housing 50. The weld head may be as much as 13 feet in length or longer. As described in further detail below, the weld head may include a gas-tungsten arc welding head near the top of the weld head. The gas-tungsten arc welding head may include a torch and a weld wire feeder, and rotates and moves up or down, in a slow manner in order to apply a thin cladding layer.

The cladding 89 is corrosion resistant due to its fine ferrite structure. The cladding material typically consists of a metal alloy, such as Alloy 82, Type 308L stainless steel or Type 316L stainless steel; however, the cladding of the present invention is not limited to these alloys.

Additionally, cladding 89 may be alloyed with a noble metal to provide additional mitigation to stress corrosion cracking. A welding apparatus and technique used to apply the cladding with alloyed noble metal is described in commonly assigned U.S. patent application Ser. No. 09/416,943 to OFFER et al., entitled APPARATUS AND METHOD FOR CORROSION RESISTANT CLADDING, the contents of which are hereby incorporated by reference in their entirety. Briefly described, the welding technique joins the cladding 89 to the heat affected zone 99, which is a region susceptible to stress corrosion cracking. The cladding 89 may be applied under conditions of low heat input to achieve reduced or no thermal sensitization at the edges of the newly clad region.

The apparatus applies a cladding that includes a filler material comprised of nickel-base alloys or iron-base stainless steels such as the aforementioned Inconel 82, Stainless 308L or Stainless 316L, which may be alloyed with a low concentration of a noble metal element (e.g., palladium, platinum, rhodium, or combinations thereof) to act as a catalyst for improved recombination rates of oxygen with hydrogen, at reduced hydrogen addition levels. The concentration of noble metal in the filler material may preferably be in the region of about 1% by weight or less, more usually about 0.25 to 0.75% by weight after dilution by base metal. Recombination of the oxygen and hydrogen peroxide with hydrogen reduces the effective electrochemical potential, in order to reduce the susceptibility to IGSCC.

The apparatus remotely applies the cladding 89, at a significant distance from the end of the apparatus as noted above. The apparatus has the ability to provide a very stable arc voltage (and corresponding arc length control) even though the torch is positioned far from weld head drive mechanisms. The apparatus may include a rotating wire feeder which produces a wire pool very far downstream of the distal end of the wire feeder. Weldability at very low, yet stable, wire feed rates (e.g., approximately 60–80 cm/min) is therefore improved, enabling very thin cladding to be reliably deposited, with a cladding thickness preferably in a range of about 0.3–0.6 mm, and more preferably between about 0.36 to 0.45 mm thick.

The welding torch of the apparatus uses sufficiently low heat input (in a range of about 0.6–1.0 kJ/cm, for example) that a required through-wall temperature gradient for far-wall stress improvement can be obtained, even without liquid cooling on a far wall.

The reduced heat input to apply the cladding 89 may be produced in part by a travel speed (torch speed) in excess of about 10 inches per minute, for example 15 to 40 inches per minute, more usually 15–30 inches per minute, so that the time in the sensitizing temperature range during cooling of the applied cladding 89 is insufficient to allow carbides to precipitate on the grain boundaries.

Sensitization control may be effected utilizing dual controls on welding parameters: (1) heat input (controlled as a function of the heat input per unit length of bead), and (2) heat affected zone cooling rate (controlled as a function of the welding linear speed in the forward direction). Preferably, cross-bead arc oscillation is avoided, since it is counterproductive with respect to maintaining both the required low heat input and high travel speed. Thus, electric-arc based cladding processes may be applied to the heat affected zone 99 even with very low resistance to thermal sensitization, and without high risk of sensitization.

The method of permanently repairing or sealing a CRD housing/stub tube can also be applied to in-core monitor housings (ICMH). An ICMH is smaller diameter vessel penetration than the CRD housing/stub tube located in a reactor pressure vessel bottom head region. There are typically between about 29–70 ICMH's, depending upon the size of the reactor pressure vessel. In an alternative embodiment, the method may be applied to ICMHs that do not contain a stub tube, but include a weld buildup that approximates the functions and structure of a stub tube. The method and apparatus described above for applying the cladding may also be used to apply cladding on ICMH's. Further, the method and apparatus for applying the cladding may be used to apply the weld 97 shown in FIG. 2. In other words, weld 97 may be a metal that is alloyed with a noble metal to reduce susceptibility to IGSCC.

Accordingly, the above-described method facilitates permanent repairing stress corrosion cracks adjacent the upper stub tube weld and the lower stub tube weld, more quickly and more easily than known methods. In addition, such repairs may be substantially completed from below the bottom head dome, and may significantly reduce stresses typically caused by thermal growth mismatches between the CRD housing and the bottom head dome.

The re-attachment weld does not affect the existing stub tube and the upper housing section, so there are no additional stresses induced from the process of re-attaching the existing lower portion 92 to the CRD 50. The method permanently mitigates the potential damage due to leaking CRD stub tubes, regardless of origin, without adversely affecting the remaining stub tube/CRD housing. Additionally, since the existing lower portion 92 of CRD housing 50 is re-used and remains in place, there are minimal alignment issues, and existing CRD hydraulic lines are unaffected. Moreover, overall implementation time is shorter than current permanent repair options, reducing critical path outage time and reducing the dose received by maintenance personnel during the repair.

The invention being thus described, it will be obvious that the same may be varied in many ways. For example, the cladding techniques may be applied to a re-attachment weld in repairs where a lower portion member such as a replacement lower portion of a CRD housing is inserted in place of a defective lower portion and welded to an upper portion of a CRD housing and/or a sidewall of a bottom head dome opening in a reactor pressure vessel. Such variations are not to be regarded as a departure from the spirit and scope of the invention, and all such modifications as would be obvious to one skilled in the art are intended to be included within the scope of the following claims.

What is claimed:

1. A method for sealing an elongate hollow member within a reactor pressure vessel of a nuclear reactor, the reactor pressure vessel including a bottom head dome, a stub tube, and the elongate hollow member, the bottom head dome having at least one opening therein, the stub tube having a first end, a second end, and a bore extending between the first and second ends, the stub tube welded to the bottom head dome adjacent the second end with a lower stub tube attachment weld so that the stub tube bore and the bottom head dome opening are substantially aligned, the elongate hollow member having a first end, a second end, and a bore extending between the first and second ends, the elongate member extending through the stub tube bore and secured to the stub tube adjacent the stub tube first end with an upper stub tube attachment weld, the method comprising the steps of:

cutting the elongate member at a location below the upper stub tube weld to separate an upper portion of the elongate member from a lower portion of the elongate member, the lower portion having an upper end and lower end;

re-attaching the lower portion to a different location at the bottom head dome opening than where the elongate member was cut with a re-attachment weld that is formed on an interior surface of the lower portion at the upper end, application of the re-attachment weld forming a heat affected zone; and applying a corrosion resistant material on the heat-affected zone.

2. The method of claim 1, wherein the step of re-attaching is performed without re-attaching the lower portion to the upper portion of the elongate member.

3. The method of claim 1, wherein
the step of applying further includes applying a corrosion resistant cladding so as to substantially cover the heat affected zone.

4. The method of claim 1, wherein the step of applying further includes applying a corrosion resistant cladding alloyed with a noble metal so as to substantially cover the heat-affected zone.

5. The method of claim 1, wherein
the bottom head dome opening is defined by a bottom head sidewall, and
the step of re-attaching further includes temper bead welding the lower portion member to the bottom head sidewall.

6. The method of claim 1, wherein the different location is at a point below potential differential leakage paths in the elongate member.

7. The method of claim 1, further comprising:
cleaning the bottom head dome opening.

8. The method of claim 7, wherein the step of cleaning further includes honing the bottom head dome opening.

9. The method of claim 7, wherein the step of cleaning further includes grinding the bottom head dome opening.

10. The method of claim 1, further comprising:
cleaning the upper end of the lower portion in preparation for the re-attachment step.

11. The method of claim 10, wherein the step of cleaning further includes honing the upper end.

12. The method of claim 10, wherein the step of cleaning further includes grinding the upper end.

13. A reactor pressure vessel of a nuclear reactor, comprising:
a bottom head dome having at least one opening therein;
a stub tube having a first end, a second end, and a stub tube bore extending between the first and second ends, the stub tube welded to the bottom head dome adjacent the second end with a lower stub tube attachment weld so that the stub tube bore and the bottom head dome opening are substantially aligned; and
a multi-part elongate hollow member composed of a first portion and a second portion, the elongate member extending through the stub tube bore and secured to the stub tube adjacent the stub tube first end with an upper stub tube attachment weld, and the second portion having an upper end and a lower end and being sealable to the first portion below the upper stub tube attachment weld with a re-attachment weld that is formed on an interior surface of the second portion at said upper end, application of the re-attachment weld forming a heat affected zone that is covered with a corrosion resistant material.

14. The reactor pressure vessel of claim 13, wherein the weld is applied at a location that is below potential differential leakage paths in the elongate member.

15. The reactor pressure vessel of claim 13, wherein the corrosion resistant material is a corrosion resistant cladding.

16. The reactor pressure vessel of claim 13, wherein the corrosion resistant material is a corrosion resistant cladding alloyed with a noble metal.

17. The reactor pressure vessel of claim 13, wherein
the bottom head dome opening is defined by a bottom head sidewall, and
the second portion of the elongate hollow member is temper bead welded to the reactor pressure vessel at the bottom head sidewall.

18. The reactor pressure vessel of claim 13, wherein the second portion is not welded to the first portion of the elongate hollow member.

19. A control rod drive mechanism housing within a reactor pressure vessel of a nuclear reactor that is inserted within a stub tube through a bottom head dome of the reactor pressure vessel, at least part of the control rod drive mechanism fixedly secured to the bottom head dome via the stub tube, comprising:
an upper portion; and
a lower portion, the lower portion formed by cutting the control rod drive mechanism housing below said stub tube, the lower portion re-attached to the upper portion at a location different from where the lower portion was cut, the location embodied as a weld passage formed on an interior surface of the control rod drive mechanism between the upper and lower portions, the weld passage including a re-attachment weld formed therein, application of the re-attachment weld forming a heat affected zone, the re-attachment weld sealing the lower portion to the upper portion at an opening of the bottom head dome, the heat-affected zone substantially covered with a corrosion resistant cladding.

20. The control rod drive mechanism housing of claim 19, wherein the corrosion resistant cladding is alloyed with a noble metal.

21. The method of claim 1, wherein the applied corrosion resistant material is at a thickness in a range of at least about 0.3 to 0.6 mm.

22. The method of claim 21, wherein the applied corrosion resistant material is at a thickness in a range of 0.36 to 0.45 mm.

23. The reactor pressure vessel of claim 13, wherein the corrosion resistant material is at a thickness in a range of at least about 0.3 to 0.6 mm.

24. The reactor pressure vessel of claim 23, wherein the corrosion resistant material is at a thickness in a range of 0.36 to 0.45 mm.

25. The control rod drive mechanism housing of claim 19, wherein the corrosion resistant material is at a thickness in a range of at least about 0.3 to 0.6 mm.

* * * * *